(12) United States Patent
Diep et al.

(10) Patent No.: US 9,599,140 B2
(45) Date of Patent: Mar. 21, 2017

(54) PLASTIC SERVICEABLE SCREW GROMMET AND RELATED METHODS

(71) Applicant: NEWFREY LLC, Newark, DE (US)

(72) Inventors: Tien The Diep, West Bloomfield, MI (US); Oday Amer Jamil, Farmington Hills, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 14/825,313

(22) Filed: Aug. 13, 2015

(65) Prior Publication Data

US 2016/0061243 A1 Mar. 3, 2016

Related U.S. Application Data

(60) Provisional application No. 62/042,879, filed on Aug. 28, 2014.

(51) Int. Cl.
*F16B 13/06* (2006.01)
*F16B 37/04* (2006.01)

(52) U.S. Cl.
CPC ............ *F16B 13/063* (2013.01); *F16B 37/04* (2013.01); *F16B 37/041* (2013.01); *F16B 37/043* (2013.01)

(58) Field of Classification Search
CPC ...... F16B 13/06; F16B 13/063; F16B 13/065; F16B 13/066; F16B 13/124; F16B 37/04; F16B 37/041; F16B 37/043
USPC .................................... 411/54, 55, 60.3, 508
See application file for complete search history.

(56) References Cited

U.S. PATENT DOCUMENTS

| 2,836,215 | A | * | 5/1958 | Rapata | ..................... F16B 12/30 174/158 R |
| 3,241,428 | A | | 3/1966 | Fischer | |
| 3,342,098 | A | * | 9/1967 | Schuplin | ............... F16B 37/043 411/15 |
| 3,701,302 | A | * | 10/1972 | Pestka | ..................... F16B 21/02 411/15 |

(Continued)

FOREIGN PATENT DOCUMENTS

| DE | 1173737 B | 7/1964 |
| DE | 2813749 A1 | 10/1978 |
| DE | 19709857 A1 | 11/1997 |

OTHER PUBLICATIONS

Extended European Search Report dated Jan. 15, 2016 in corresponding EP Patent Application No. 15182340.8.

*Primary Examiner* — Roberta Delisle
(74) *Attorney, Agent, or Firm* — Harness, Dickey & Pierce, PLC

(57) ABSTRACT

A retaining wing can be hingedly coupled to an outer surface of each of two legs along a hinge line. The retaining wing can include a leading edge facing toward, and a trailing edge facing away from, the distal end of the legs, and together with the hinge line can define a substantially triangular shape. When a screw is not present in the screw passage, engagement of the trailing edge against one of the automobile components can operate to direct a servicing removal force applied through the base inwardly on the wings causing the wings to flex inwardly and permit removal of the screw grommet from the aperture without damaging any of the components or requiring a separate inwardly directed force to be directly applied to the wings. An associated method is also provided.

28 Claims, 3 Drawing Sheets

(56) References Cited

U.S. PATENT DOCUMENTS

| | | | | |
|---|---|---|---|---|
| 3,701,373 A | * | 10/1972 | Wronke | F16B 37/043 411/182 |
| 3,756,116 A | | 9/1973 | Schuplin | |
| 3,871,430 A | | 3/1975 | Meyer | |
| 4,070,945 A | | 1/1978 | Kurosaki | |
| 4,077,300 A | | 3/1978 | Yoda | |
| 4,082,030 A | | 4/1978 | Erickson | |
| 4,579,492 A | | 4/1986 | Kazino et al. | |
| 4,657,458 A | | 4/1987 | Wollar et al. | |
| 4,668,145 A | | 5/1987 | Hirohata | |
| 4,704,059 A | | 11/1987 | Nakama et al. | |
| 4,743,152 A | | 5/1988 | Nakayama et al. | |
| 4,906,152 A | | 3/1990 | Kurihara | |
| 4,927,306 A | | 5/1990 | Sato | |
| 5,028,190 A | * | 7/1991 | Loughlin, Jr. | B62D 29/048 411/15 |
| 5,593,262 A | | 1/1997 | Gedeon et al. | |
| 5,632,584 A | * | 5/1997 | Acevedo | F16B 37/043 411/182 |
| 5,636,953 A | | 6/1997 | Jaeger et al. | |
| 5,718,549 A | | 2/1998 | Noda et al. | |
| 6,213,700 B1 | | 4/2001 | Everard | |
| 6,805,524 B2 | | 10/2004 | Kanie et al. | |
| 7,008,159 B2 | | 3/2006 | Dendo | |
| D641,609 S | | 7/2011 | Yagame et al. | |
| 8,486,120 B2 | * | 7/2013 | Shimko | A61C 8/0033 411/55 |
| 2003/0143054 A1 | * | 7/2003 | Kanie | F16B 5/02 411/175 |
| 2007/0183864 A1 | * | 8/2007 | Shishikura | B60R 13/04 411/323 |
| 2008/0066266 A1 | | 3/2008 | Scroggie et al. | |
| 2010/0322743 A1 | | 12/2010 | Ostergren | |
| 2011/0091301 A1 | | 4/2011 | Shimizu et al. | |
| 2012/0131772 A1 | | 5/2012 | Hofmann et al. | |
| 2012/0155985 A1 | * | 6/2012 | Ruckel | F16B 37/0842 411/301 |
| 2013/0017033 A1 | * | 1/2013 | Brown | B60R 19/24 411/112 |
| 2013/0039718 A1 | * | 2/2013 | Fellows | F16B 37/0842 411/112 |

\* cited by examiner

PLASTIC SERVICEABLE SCREW GROMMET AND RELATED METHODS

CROSS-REFERENCE TO RELATED APPLICATIONS

This application claims the benefit of U.S. Provisional Application No. 62/042,879, filed on Aug. 28, 2014. The entire disclosure of the above application is incorporated herein by reference.

FIELD

The present disclosure relates to a plastic screw grommet for connecting and securing a component to a joining part, such as an automotive panel and, more specifically, to such plastic screw grommets having laterally extending retention wings in addition to laterally expanding legs.

BACKGROUND

This section provides background information related to the present disclosure which is not necessarily prior art.

Pin and grommet fasteners are commonly used in the automotive industry. Use of a pin and grommet fastener typically requires insertion of the grommet into an aperture of a joining part. Such grommets can include retention wings extending from opposite sides of the grommet. Such retention wings are typically angled downwardly away from horizontal hinged ends to provide engaging surfaces or stops at the opposite end of the wing. During insertion of the grommet into the aperture of the joining part, the wings flex inwardly along the hinge until they are released by the aperture when they flex outwardly, causing the stops to engage against the periphery of the aperture. In this way, the grommet can be appropriately positioned and held against the joining part until the legs of the grommet are laterally expanded by inserting the screw into the grommet.

Serviceability can be a problem for such screw grommets because the retention wings can make it difficult, if not impossible, to remove the grommet once it has been inserted without causing damage to the parts. Even after the screw has been removed from the grommet allowing the legs to return to their unexpanded state or position, the stops of the wings remain locked against the joining part. Thus, attempts to remove the grommet for servicing can damage the grommet, the joining part, or both. Damage to the grommet can be particularly problematic where the grommet is integrally molded as a single piece component that is being joined to the joining part. Thus, servicing can require replacement of the joining part, the grommet bearing part, or both.

SUMMARY

This section provides a general summary of the disclosure, and is not a comprehensive disclosure of its full scope or all of its features.

In accordance with one aspect of the present disclosure, a plastic serviceable screw grommet for joining automobile components can include a base and a pair of legs extending upwardly from the base and defining screw passage between the legs. The screw passage can define a central longitudinal axis. A retaining wing can be hingedly coupled to an outer surface of each of the legs along a hinge line. Each retaining wing can extend outwardly from the outer surface. The hinge line can extend parallel to the central longitudinal axis or at a hinge line angle that is less than about 45 degrees from the central longitudinal axis. The retaining wing can have a trailing edge defining a retention surface. When the screw grommet is inserted into an aperture of a first of the automobile components, at least a portion of the retention surface can extend along its length at a retention angle relative to an adjacent surface of the first of the automobile components. When the screw grommet is inserted into the aperture and a screw is not present in the screw passage, the retention angle can be such that engagement of the retention surface against the first of the automobile components can operate to direct a portion of a servicing removal force applied to the screw grommet inwardly on the wings causing the wings to flex inwardly to a collapsed position and permit removal of the screw grommet from the aperture without damaging any of the grommet and the automobile components and without the need to apply a separate inwardly directed force against the wings.

In accordance with another aspect of the present disclosure a plastic serviceable screw grommet for joining automobile components can include a base and a pair of legs extending upwardly from the base and defining screw passage between the legs. The screw passage can define a central longitudinal axis. A retaining wing can be hingedly coupled to an outer surface of each of the legs along a hinge line. The retaining wing can extend outwardly from the outer surface. The retaining wing can include a leading edge facing toward a distal end of the legs and a trailing edge facing away from the distal end of the legs. The hinge line, leading edge, and trailing edge can define a substantially triangular shape. When the screw grommet is inserted into an aperture of a first of the automobile components and a screw is not present in the screw passage, engagement of the trailing edge against the first of the automobile components can operate to direct a portion of a servicing removal force, applied to the screw grommet through the base, inwardly on the wings causing the wings to flex inwardly to a collapsed position that permits removal of the screw grommet from the aperture without damaging any of the grommet and the automobile components and without requiring any separate inwardly directed force to be directly applied to the wings.

In accordance with yet another aspect of the present disclosure a method of removing a plastic serviceable screw grommet from an aperture of a first automobile component after the grommet has been inserted in to the aperture is also provided. The method can include removing a screw from a screw passage defined between a pair of legs extending from a base of the plastic serviceable screw grommet. A servicing removal force can be applied to the screw grommet, causing the first automobile component to engage a trailing edge, facing away from the distal end of the legs, of a substantially triangularly shaped retaining wing that is hingedly coupled to, and extending outwardly from, an outer surface of each of the legs along a hinge line. The engagement of the trailing edge against the first automobile component can operate to direct a portion of a servicing removal force, applied to the screw grommet through the base, inwardly on the wings causing the wings to flex inwardly to a collapsed position and permit removal of the screw grommet from the aperture without damaging any of the grommet and the automobile components. Continuing to remove the grommet from the aperture over the retaining wings can engage the first automobile component along a leading edge facing toward the distal end of the legs, which leading edge, hinge line, and trailing edge can define the substantially triangular shape.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
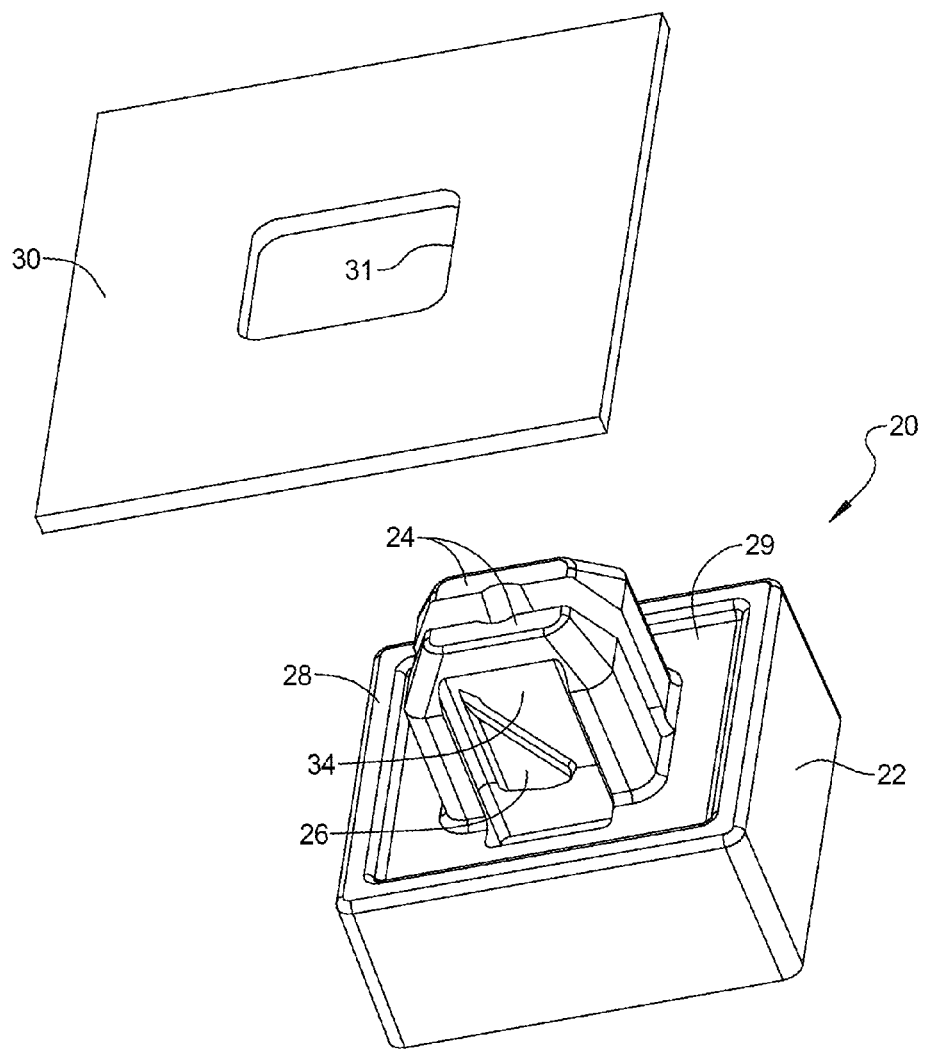
FIG. 1 is an exploded perspective view of an exemplary plastic serviceable screw grommet in accordance with the present disclosure and joining part.
Figure 2:
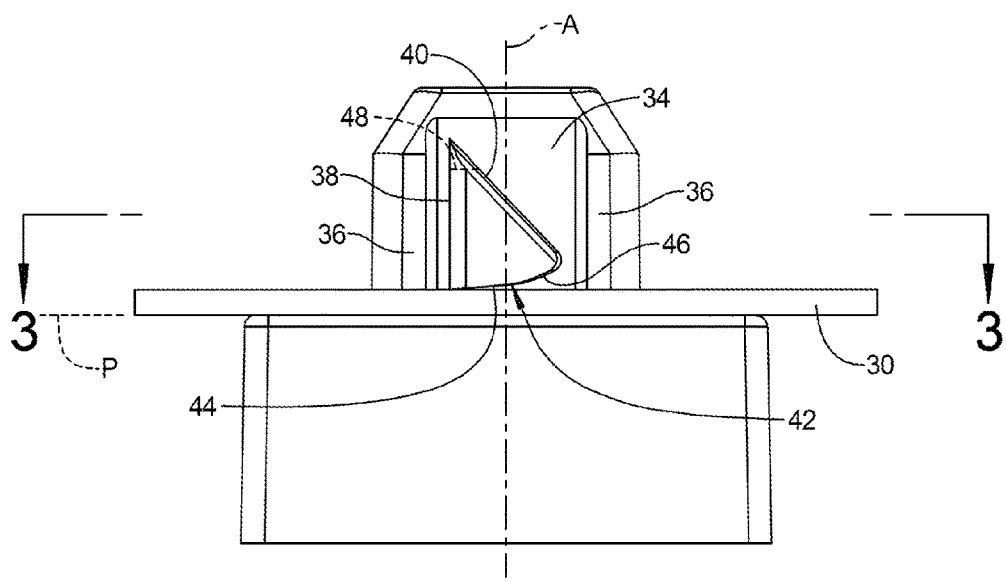
FIG. 2 is a side elevation view of the plastic serviceable screw grommet of FIG. 1.
Figure 3:
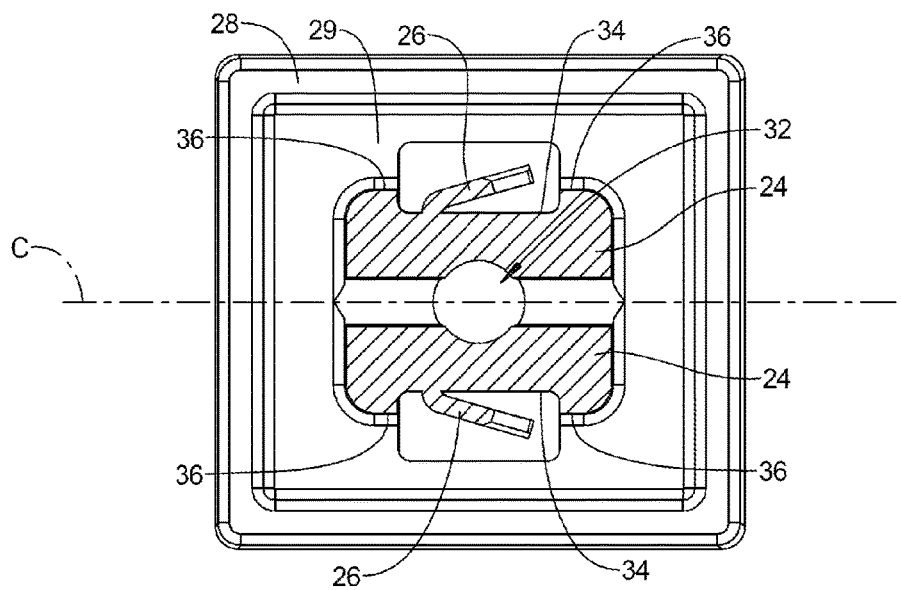
FIG. 3 is a cross sectional view taken along line 3-3 of FIG. 2.
Figure 4:
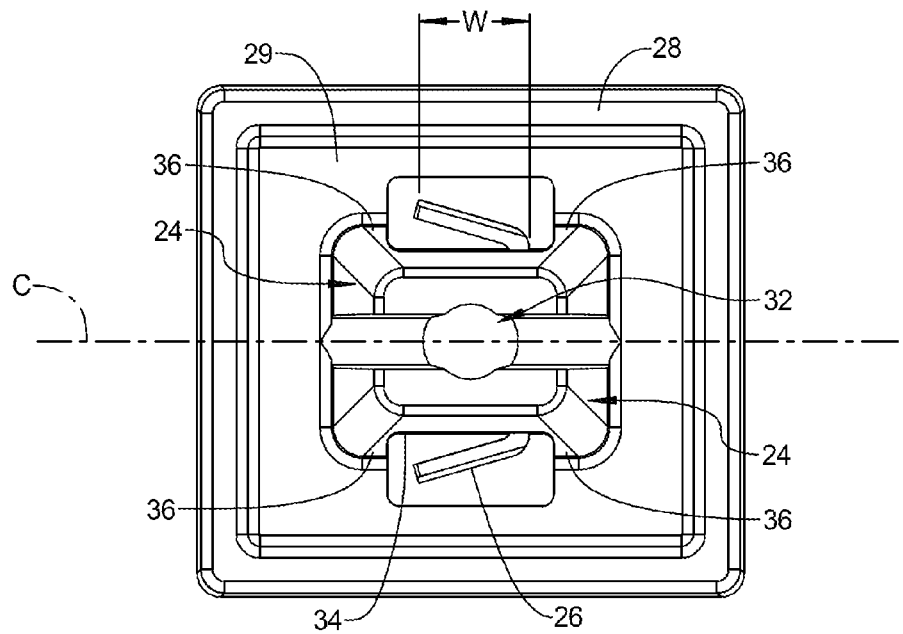
FIG. 4 is a top plan view of the plastic serviceable screw grommet of FIG. 1.

Example embodiments will now be described more fully with reference to the accompanying drawings.

Referring to FIGS. 1-5, a screw grommet 20 can generally include a base 22, a pair of legs 24, and a retaining wing 26 hingedly extending from each of the legs 24. The base 22 can include an engaging surface 28 against which a joining part 30 rests, and the engaging surface 28 can define a joining plane "P" (corresponding to the lower surface of the joining part 30 in FIG. 2). The legs 24 extend from the base 22 with the base 22 and legs 24 defining a screw passage 32 between the legs 24. The screw passage 32 can have a longitudinal axis "A." The longitudinal axis "A" can be substantially perpendicular to the joining plane "P."

Although illustrated as a separate part, the base 22, and therefore the entirety of the plastic screw grommet 20, can be integrally molded as a single part of a plastic component that is to be joined to the joining part 30. In some cases, the plastic component can have a plurality of plastic screw grommets 20 integrally molded therewith; each screw grommet 20 being provided for insertion into a corresponding aperture 31 of the joining part 30. The base 22 can also include a recessed surface 29 below the engaging surface 28. This can enable a foam or resilient member 50, which can have a shape generally corresponding to the shape of the recessed surface 29, to be provided between the recessed surface 29 of the screw grommet 20 and the adjacent surface of the joining part 30. In some cases, the wings 26 can retain the foam member 50 on the screw grommet 20 during shipping from the grommet manufacturer to the user.

Each leg 24 can include a central laterally recessed area 34. In other words, each leg 24 includes a laterally inwardly recessed area 34 defined between end portions 36 that protrude laterally outwardly relative to the recessed area 34. The retaining wing 26 of each leg 24 can be hingedly coupled to the leg 24 in the recessed area 34. This can permit the wings 26 to have a size and shape that is more substantial than could be provided without the recessed area 34. Thus, the necessary retention force can be provided while also enabling removal of the grommet 20 for servicing as described hereinafter. Although two wings 26 are shown in the illustrated example, more or less wings 26 can be provided. In other words, at least one or at least two wings 26 can be desirable in some instances. In addition, when multiple wings 26 are provided, each wing need not have the same configuration. In other words, the thickness, angles, etc. can be different for different wings.

The retaining wings 26 can have a generally triangular shape, which can further resemble a right triangle. The generally triangular shape of the retaining wing can be truncated at its uppermost end (as oriented in FIG. 2) adding another small upwardly facing side as indicated by dotted line 48 in FIG. 2. Each retaining wing 26 can be hingedly coupled to its corresponding leg 24 along a hinge line or edge 38. The hinge line 38 can extend in a direction that is substantially parallel to the longitudinal axis "A" of the screw passage 32, or substantially perpendicular to the joining plane "P," or both. In some cases, the hinge line 38 can extend in a direction that is less than about 45 degrees from the longitudinal axis "A". Similarly, the hinge line 38 can extend in a direction that is more than about 45 degrees from the joining plane "P."

In some cases, the wings 26, including at the hinged coupling, can have a thickness of greater than or equal to 0.5 mm. In some cases, the wing 26 can extend at an angle relative to the wall of the recessed area 34 or relative to the central plane "C" that, in some cases, can be between about 2 degrees and about 46 degrees, in some cases, this angle can be between about 5 degrees and about 35 degrees, in some cases, this angle can be between about 10 degrees and about 20 degrees and in some cases, this angle can be about 16 degrees.

In some cases, the overall width "W" of the wing 26 can be between about 2 mm and about 10 mm, in some cases, this overall width "W" can be between about 2 mm and about 8 mm, in some cases, this overall width "W" can be between about 3 mm and about 7 mm, and in some cases is about 5 mm.

Each wing 26 has a leading edge 40 and a trailing edge 42 during insertion. The leading edge 40 can extend at an angle relative to the longitudinal axis "A" or relative to the hinge line 38 that, in some cases, can be between about 14 degrees and about 74 degrees, in some cases, this angle can be between about 30 degrees and about 60 degrees, in some cases, this angle can be between about 40 degrees and about 50 degrees and in some cases, this angle can be about 44 degrees.

The leading edge 40 of the wing 26 can have a beveled or chamfered outer edge along its length. The chamfer or bevel can, in some cases, be between about 5 degrees and about 70 degrees, in some cases, this angle can be between about 15 degrees and about 55 degrees, in some cases, this angle can be between about 25 degrees and about 45 degrees and in some cases, this angle can be about 35 degrees.

The trailing edge 42 can define a compound retention surface 44 and 46. Proximal portion 44 of the trailing edge 42 or retention surface 42 can extend at an angle relative to the joining plane "P" or to the adjacent surface of the joining part 30 that, in some cases, can be between about zero degrees and about 15 degrees; in some cases, this angle can be between about 3 degrees and about 10 degrees, and in some cases, this angle can be about 5 degrees. Thus, the compound retention surface 44 and 46, such as the proximal portion 44, can comprise such angles as described.

Distal portion 46 of the retention surface 42 can extend at an angle relative to the joining plane "P" or to the adjacent surface of the joining part 30 that, in some cases, can be between about 12 degrees and about 33 degrees; in some cases, this angle can be between about 17 degrees and about 28 degrees, and in some cases, this angle can be about 23 degrees. Thus, the compound retention surface 44 and 46, such as the distal portion, can comprise such angles as described. In addition, the distal end of distal portion 46 can be radiused as illustrated in the drawings.

As used herein, the "servicing removal force" means the separating force required to remove the grommet 20 from the joining part 30 (after removing the screw 52) without damaging the grommet 20 or the joining part 30. The servicing removal force is applied as a separating force (generally along line A) between the grommet 20 and joining part 30. Due to the configuration of the wings 26, this separating servicing removal force is partially converted to a laterally inwardly directed force acting on the wings 26 to move them toward their collapsed position as discussed herein. Thus, the grommet 20 can be removed from the aperture 31 of the joining part 30 without damaging the grommet 20 or joining part 30 and without the need to separately apply a laterally inwardly directed force against the wings 26, which are often inaccessible when the grommet 20 is assembled to the joining part 30.

Associated methods of manufacturing and using the serviceable screw grommet 20 should be apparent from the above discussion. For example, such methods of manufacturing the serviceable screw grommet 20 can include providing a plastic serviceable screw grommet 20 with any combination of the features, sizes, angles, etc., described herein. In addition, a foam or resilient member 50 can be assembled around the legs 24 of the plastic serviceable screw grommet 20 and retained by the wings 26 during shipment to the user.

The user can insert the plastic serviceable screw grommet 20 into a corresponding aperture 31 of the joining part 30. Edges of the aperture 31 of the joining part 30 can engage along the leading edge 40 of the wings 26 causing them to move laterally inwardly (opposite to the direction indicated by arrows "O" of FIG. 5) toward a flexed or collapsed position adjacent the wall of the corresponding recess 34. As the upper surface (as oriented in FIG. 2) of the joining part 30 moves past the trailing edge 42 of the wings 26, the wings 26 return to their laterally outwardly extended position. In this laterally outwardly extended position, the trailing edge 42 of the wings 26 can engage against the upper surface (as oriented in FIG. 2) of the joining part 30 to retain the grommet 20 in the corresponding aperture 31 of the joining part 30 with the lower surface (as oriented in FIG. 2) of the joining part 30 engaged against the engaging surface 28. In this state, the screw grommet 20 is releasably coupled to the joining part 30, because it can be removed without damage as discussed herein.

Figure 5:
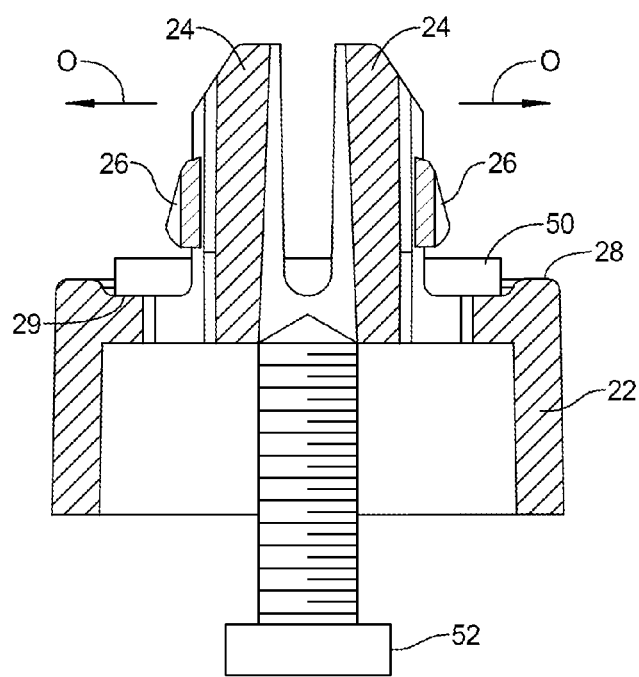
FIG. 5 is a central cross-sectional view taken perpendicular to central plane C through the plastic serviceable screw grommet of FIG. 1.

The screw 52 can then be inserted into the screw passage 32 causing the legs 24 to extend laterally outwardly (as indicated by arrows "O" in FIG. 5). In this laterally outwardly extended position of the legs 24, the plastic serviceable screw grommet 20 cannot be removed from the joining panel 30 without damaging the joining panel 30, the screw grommet 20, or both. In other words, in this state the grommet 20 is non-releasably or fully coupled to the joining part or panel 30. As noted above, this can be done for a plurality of screw grommets 20 integrally molded together as a single piece plastic component to be joined to the joining part 30 via a corresponding plurality of cooperating apertures 31.

If there is subsequently a desire to remove the screw grommet 20 from the joining part 30, then the screw 52 can be removed from the screw passage 32, allowing the legs 24 to move laterally inwardly toward their original, unexpanded position. Thus, the grommet is returned to the state where it is releasably coupled to the joining part 30. In this laterally inward position, the legs 24 do not prevent removal of the plastic serviceable screw grommet 20 from the aperture 31 of the joining part 30 without damaging the grommet 20 or the joining part 30.

The trailing surface of the wings 26 can be provided with a configuration that, upon application of a servicing removal force (substantially along axis "A") to separate the grommet 20 from the joining part 30, causes the wings 26 to flex laterally inwardly toward their collapsed positions allowing the grommet 20 to be removed from the joining part 30 without damaging the grommet 20 or the joining panel 30 and without the need to separately access or exert any other force on the wings 26. For example, the trailing edge 42 of the wings 26 of the plastic screw grommet 20 can be angled so that as a pull-out or servicing removal force is applied to the base 22 of the grommet 20 (when the screw 52 is removed) the trailing edge 42 angle(s) operate to direct a portion of the pull-out or servicing removal force inwardly on the wings 26, causing the wings 26 to move inwardly and allowing removal and reuse of the grommet 20. In some cases, this can include the trailing edge 42 comprising any one or combination of the proximal portion 44 and distal portion 46 of the trailing edge 42 with the angles described herein. In some cases, it can also include providing the radiused distal end of distal portion 46 of the wing 26. Thus, servicing can be accomplished without the likelihood that the grommet 20, and in particular a component integrally formed as a single piece component including one or more grommets 20, or the joining part 30 will be damaged and need to be replaced.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plastic serviceable screw grommet for joining automobile components comprising:
   a base;
   a pair of legs extending upwardly from the base and defining screw passage between the legs, the screw passage defining a central longitudinal axis;
   a retaining wing hingedly coupled to an outer surface of each of the legs along a hinge line, the retaining wing extending outwardly from the outer surface, the hinge line extending parallel to the central longitudinal axis or at a hinge line angle that is less than about 45 degrees from the central longitudinal axis, the retaining wing having a trailing edge defining a retention surface;
   wherein, when the screw grommet is inserted into an aperture of a first of the automobile components, at least a portion of the retention surface extends along its length at a retention angle relative to an adjacent surface of the first of the automobile components;
   wherein, when the screw grommet is inserted into the aperture and a screw is not present in the screw passage, the retention angle is such that engagement of the retention surface against the first of the automobile components operates to direct a portion of a servicing removal force, applied to the screw grommet through the base, inwardly on the wings causing the wings to flex inwardly to a collapsed position and permit removal of the screw grommet from the aperture without damaging any of the grommet and the automobile components and without applying a separate inwardly directed force against the wings.

2. The plastic serviceable screw grommet of claim 1, wherein, when the screw grommet is inserted into the aperture and a screw is inserted into the screw passage the legs move outwardly and removal of the screw grommet from the aperture without damaging any of the grommet and the automobile components or applying the separate inwardly directed force against the wings is prevented.

3. The plastic serviceable screw grommet of claim 1, wherein the wing comprises a leading edge facing toward a distal end of the legs to engage against one of the automobile components during insertion of the screw grommet into an aperture the one of the automobile components.

4. The plastic serviceable screw grommet of claim 1, wherein the trailing edge is adjacent a first end of the hinge line.

5. The plastic serviceable screw grommet of claim 4, wherein the wing comprises a leading edge facing toward a distal end of the legs and the leading edge is adjacent a second, opposite end of the hinge line.

6. The plastic serviceable screw grommet of claim 1, wherein the outer surface of each leg at which the retaining wing is hingedly coupled is in a laterally inwardly recessed area defined between end portions that protrude laterally outwardly relative to the recessed area.

7. The plastic serviceable screw grommet of claim 1, wherein the screw grommet is integrally molded as a single piece with one of the automobile components.

8. The plastic serviceable screw grommet of claim 1, wherein plurality of the grommets are integrally molded as a single piece with one of the automobile components.

9. The plastic serviceable screw grommet of claim 1, wherein the base includes an automobile component engaging surface.

10. The plastic serviceable screw grommet of claim 1, wherein the trailing edge defines a compound retention surface having a proximal portion and a distal portion.

11. The plastic serviceable screw grommet of claim 10, wherein the proximal portion comprises the portion of the retention surface having the retention angle extending along its length, and the angle of the retention angle relative to the adjacent surface is between about 3 and about 10 degrees.

12. The plastic serviceable screw grommet of claim 10, wherein the distal portion comprises the portion of the retention surface having the retention angle extending along its length, and the angle of the retention angle relative to the adjacent surface is between about 12 and about 33 degrees.

13. The plastic serviceable screw grommet of claim 1, wherein the retaining wing extending outwardly in an expanded position at a wing angle relative to the outer surface, and the wing angle is between about 5 and 35 degrees.

14. The plastic serviceable screw grommet of claim 1, wherein the wing comprises a leading edge facing toward a distal end of the legs and at a leading angle relative to the longitudinal axis that is between about 30 degrees and about 60 degrees.

15. A plastic serviceable screw grommet for joining automobile components comprising:
    a base;
    a pair of legs extending upwardly from the base and defining screw passage between the legs, the screw passage defining a central longitudinal axis;
    a retaining wing hingedly coupled to an outer surface of each of the legs along a hinge line, the retaining wing extending outwardly from the outer surface, the retaining wing comprising a leading edge facing toward a distal end of the legs and a trailing edge facing away from the distal end of the legs, the hinge line, leading edge, and trailing edge define a substantially triangular shape;
    wherein, when the screw grommet is inserted into an aperture of a first of the automobile components and a screw is not present in the screw passage, engagement of the trailing edge against the first of the automobile components operates to direct a portion of a servicing removal force, applied to the screw grommet through the base, inwardly on the wings causing the wings to flex inwardly to a collapsed position and permit removal of the screw grommet from the aperture without damaging any of the grommet and the automobile components and without requiring any separate inwardly directed force on the wings.

16. The plastic serviceable screw grommet of claim 15, wherein, when the screw grommet is inserted into the aperture and a screw is inserted into the screw passage, the legs move outwardly and removal of the screw grommet from the aperture without damaging any of the grommet and the automobile components or applying the separate inwardly directed force against the wings is prevented.

17. The plastic serviceable screw grommet of claim 15, wherein the substantially triangular shape includes a truncated portion forming an edge between the hinge line and the leading edge.

18. The plastic serviceable screw grommet of claim 15, wherein the trailing edge forming one side of the substantially triangular shape defines a compound retention surface having a proximal portion and a distal portion extending at different angles relative to an adjacent automobile component surface when inserted into the aperture.

19. The plastic serviceable screw grommet of claim 18, wherein the proximal portion comprises the portion of the retention surface having the retention angle extending along its length, and the angle of the retention angle relative to the adjacent surface is between about 3 and about 10 degrees.

20. The plastic serviceable screw grommet of claim 18, wherein the distal portion comprises the portion of the retention surface having the retention angle extending along its length, and the angle of the retention angle relative to the adjacent surface is between about 12 and about 33 degrees.

21. The plastic serviceable screw grommet of claim 15, wherein the outer surface of each leg at which the retaining wing is hingedly coupled is in a laterally inwardly recessed area defined between end portions that protrude laterally outwardly relative to the recessed area.

22. The plastic serviceable screw grommet of claim 15, wherein the screw grommet is integrally molded as a single piece with one of the automobile components.

23. The plastic serviceable screw grommet of claim 15, wherein plurality of the grommets are integrally molded as a single piece with one of the automobile components.

24. The plastic serviceable screw grommet of claim 15, wherein the a leading edge extends at a leading angle relative to the longitudinal axis that is between about 30 degrees and about 60 degrees.

25. A method of removing a plastic serviceable screw grommet from an aperture of a first automobile component after the grommet has been inserted in to the aperture comprising:

removing a screw from a screw passage defined between a pair of legs extending from a base of the plastic serviceable screw grommet;

applying a servicing removal force to the screw grommet causing the first automobile component to engage a trailing edge facing away from the distal end of the legs of a substantially triangularly shaped retaining wing hingedly coupled to, and extending outwardly from, an outer surface of each of the legs along a hinge line, wherein the engagement of the trailing edge against the first automobile component operates to direct a portion of a servicing removal force, applied to the screw grommet through the base, inwardly on the wings causing the wings to flex inwardly to a collapsed position and permit removal of the screw grommet from the aperture without damaging any of the grommet and the automobile components;

continuing to remove the grommet from the aperture over the retaining wings engages the first automobile component along a leading edge facing toward the distal end of the legs, which leading edge, hinge line, and trailing edge define the substantially triangular shape of the retaining wing.

26. The method of removing a plastic serviceable screw grommet of claim 25, wherein applying a servicing removal force to the screw grommet comprises applying the servicing removal force to a second automobile component incorporating the screw grommet as an integrally molded single piece of the second automobile component.

27. The method of removing a plastic serviceable screw grommet of claim 25, comprising removing a plurality of the plastic screw grommets, wherein applying a servicing removal force to the plurality of screw grommets comprises applying the servicing removal force to a second automobile component incorporating the plurality of screw grommets as an integrally molded single piece of the second automobile component.

28. The method of removing a plastic serviceable screw grommet of claim 25, wherein applying a servicing removal force to the screw grommet causing the first automobile component to engage a trailing edge comprises causing the first automobile component to engage a compound retention surface of the trailing edge facing away from the distal end of the legs including a proximal portion and a distal portion extending at different angles relative to an adjacent automobile component surface when inserted into the aperture.

* * * * *